US007173195B2

(12) United States Patent
Michaud

(10) Patent No.: US 7,173,195 B2
(45) Date of Patent: Feb. 6, 2007

(54) ELECTRICAL OUTLET BOX HAVING CAPTIVE SCREW CLAMP

(75) Inventor: Alain Michaud, St-Jean-sur-Richelieu (CA)

(73) Assignee: Thomas & Betts International, Inc., Wilmington, DE (US)

( * ) Notice: Subject to any disclaimer, the term of this patent is extended or adjusted under 35 U.S.C. 154(b) by 0 days.

(21) Appl. No.: 11/254,830

(22) Filed: Oct. 20, 2005

(65) Prior Publication Data

US 2006/0090919 A1 May 4, 2006

Related U.S. Application Data

(60) Provisional application No. 60/624,372, filed on Nov. 2, 2004.

(51) Int. Cl.
*H02G 3/18* (2006.01)

(52) U.S. Cl. ...................... 174/653; 174/668; 174/135; 248/72; 411/433; 439/479

(58) Field of Classification Search .............. 174/65 R, 174/135, 91, 653, 656, 668; 16/2.1, 2.2; 248/56, 72, 74.1; 411/433, 267; 439/479, 439/803

See application file for complete search history.

(56) References Cited

U.S. PATENT DOCUMENTS 916,486 A 3/1909 Reeve
2,947,967 A 8/1960 Waldrop
3,084,958 A 4/1963 Appleton
3,378,806 A 4/1968 Wilkerson et al.
3,426,321 A 2/1969 Peterson, Jr.
3,434,103 A 3/1969 Hancock et al.
3,676,571 A * 7/1972 Rubinstein ................ 174/65 R
4,070,086 A 1/1978 Trafford
4,261,402 A 4/1981 Stanaitis
4,775,324 A 10/1988 Norden
4,877,364 A 10/1989 Sorrentino
5,052,643 A 10/1991 Law
5,588,880 A 12/1996 Wood
6,064,009 A * 5/2000 Jorgensen et al. .......... 174/135
6,361,382 B1 3/2002 Yamada et al.

* cited by examiner

*Primary Examiner*—Dhiru R. Patel
(74) *Attorney, Agent, or Firm*—Hoffmann & Baron, LLP

(57) ABSTRACT

The present invention provides a clamp assembly for clamping an electrical wire to the wall of the electrical outlet box. The clamp assembly includes a wire clamp non-rotatably supported in the box adjacent to the wall. The wire clamp has an internally threaded aperture therethrough. A threaded screw assembly is captively retained in the box for rotating movement without longitudinal displacement. The threaded screw extends through the threaded aperture of the clamp such that upon rotating movement of the screw, the clamp is longitudinally movable therealong.

8 Claims, 2 Drawing Sheets

ELECTRICAL OUTLET BOX HAVING CAPTIVE SCREW CLAMP

CROSS-REFERENCE TO RELATED APPLICATIONS

This application claims priority to U.S. Provisional Application No. 60/624,372 filed Nov. 2, 2004.

FIELD OF THE INVENTION

The present invention relates generally to electrical outlet boxes. More particularly, the present invention relates to metallic electrical outlet boxes which provide a wire clamp including a screw which is captivated by the box so that the screw does not extend through the box upon clamping.

BACKGROUND OF THE INVENTION

It is well known to use electrical outlet boxes to house electrical components such as switches and receptacles. These boxes are attached to wall studs. Once the wall board is placed over the studs, the outlet box provides access to the components.

Many electrical outlet boxes are formed of metal. These metallic outlet boxes typically include a back wall, a perimetrical side wall and an open-front face defining a box interior through which a switch or receptacle is placed. Openings in the back or side walls of the box allow entry of the stripped ends of electrical wires for termination to the switch or receptacle house in the box. In order to prevent the wire from inadvertently becoming removed from the box once inserted, a wire clamp is employed. A wire clamp is typically a metallic member movably held to box with a threaded screw. The clamp is captivated by the screw for movement therewith. The screw may be urged downwardly so as to move the clamp into contact with the wire, holding the wire in the electrical box.

It is common for these screws to be threadedly inserted to a threaded opening in one of the walls in the box. As the clamp is moved into clamping engagement with the wire inserted into the box, the screw is progressed such that the threaded shaft of the screw extends outwardly of the box.

By extending the screw outwardly of the box, there is the potential for damaging the dry wall or a vapor barrier which may be employed.

FIGS. 1 and 2 show a conventional metallic electrical outlet box having a clamp secured by a movable screw. The box 10 includes a back wall 12, perimetrical side wall 14 formed by a pair of opposed side walls 14*a* and 14*b* and opposed top and bottom wall 14*c* and 14*d*. A clamp 20 is secured to the back wall by a screw 22. As shown in FIG. 2, the screw 22 is attached to the back wall of the box through a threaded aperture in the back wall. As may be appreciated, movement of the screw towards the back wall to urge the clamp downward, would cause the threaded shaft of the screw to extend outwardly of the box, thus, potentially causing damage to the dry wall or the vapor barrier.

Moreover, during transportation, screws can unseat themselves from the threaded aperture causing dislodgement of the screw and the clamp. Also, since the clamp can move freely with the screw, the clamp requires the use of a clamp leg 30 on each side of the screw to raise the clamp up. This results in the necessity for more material as well as a secondary operation.

It is therefore desirable to provide an electrical outlet box which employs a wire clamp, to clamp the wire within the box without the need for screw to be progressed in such a manner that the threaded shaft of the screw extends substantially externally of the box upon clamping.

SUMMARY OF THE INVENTION

The present invention provides an electrical outlet box assembly. The electrical outlet box assembly includes a clamp assembly for clamping an electrical wire to the wall of the electrical outlet box. The clamp assembly includes a wire clamp non-rotatably supported in the box adjacent to the wall. The wire clamp has an internally threaded aperture therethrough. A threaded screw assembly is captively retained in the box for rotating movement without longitudinal displacement. The threaded screw extends through the threaded aperture of the clamp such that upon rotating movement of the screw, the clamp is longitudinally movable therealong.

DETAILED DESCRIPTION OF PREFERRED EMBODIMENTS

Figure 1:
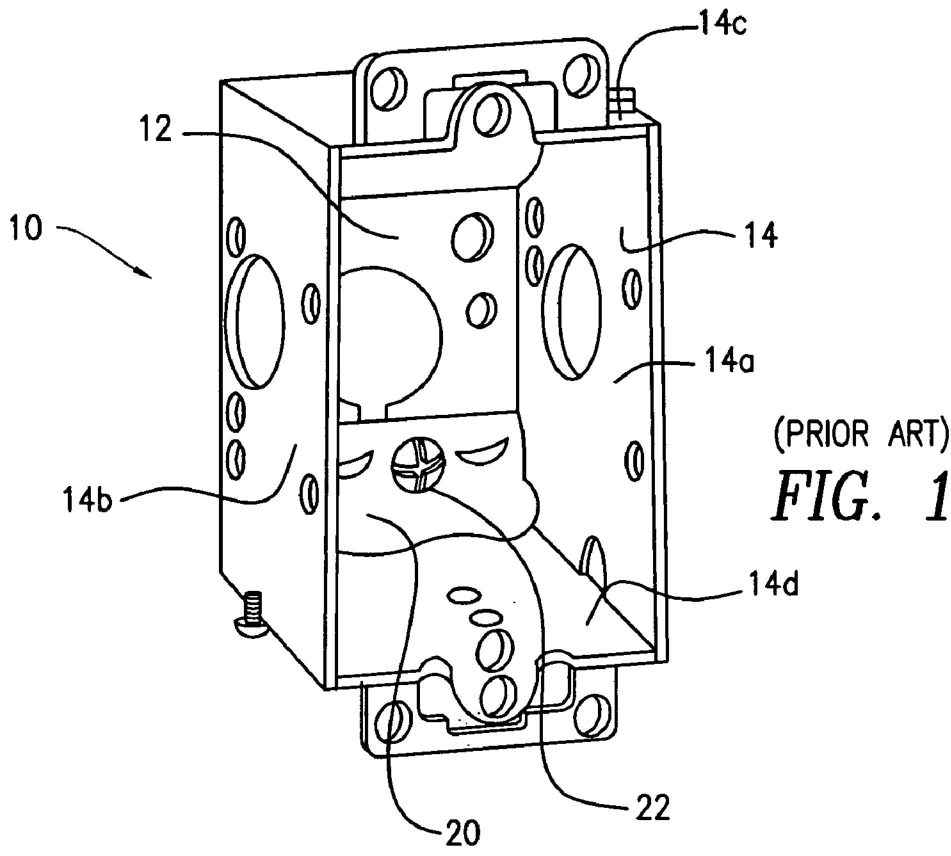
(PRIOR ART) FIG. 1
FIG. 1 is a perspective showing of a conventional electrical outlet box of the prior art employing a conventional wire clamp.
Figure 2:
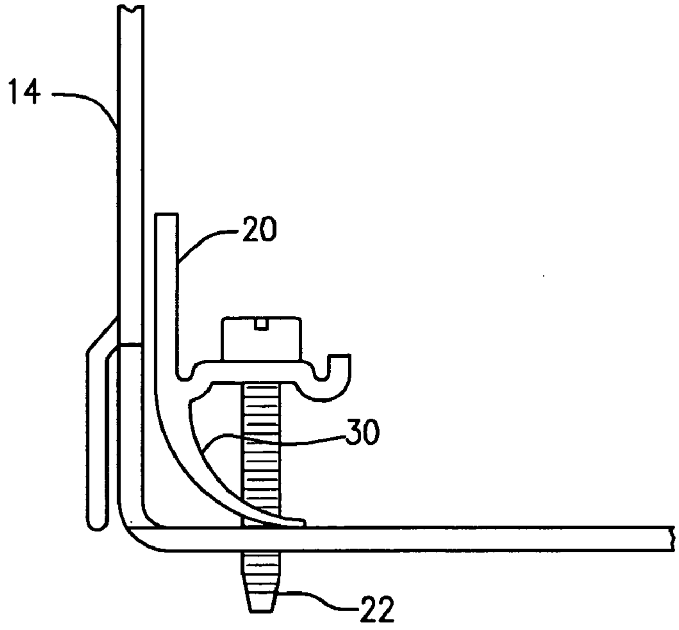
(PRIOR ART) FIG. 2
FIG. 2 is a fragmented showing of a portion of the box of FIG. 1 including the conventional wire clamp.
Figure 3:
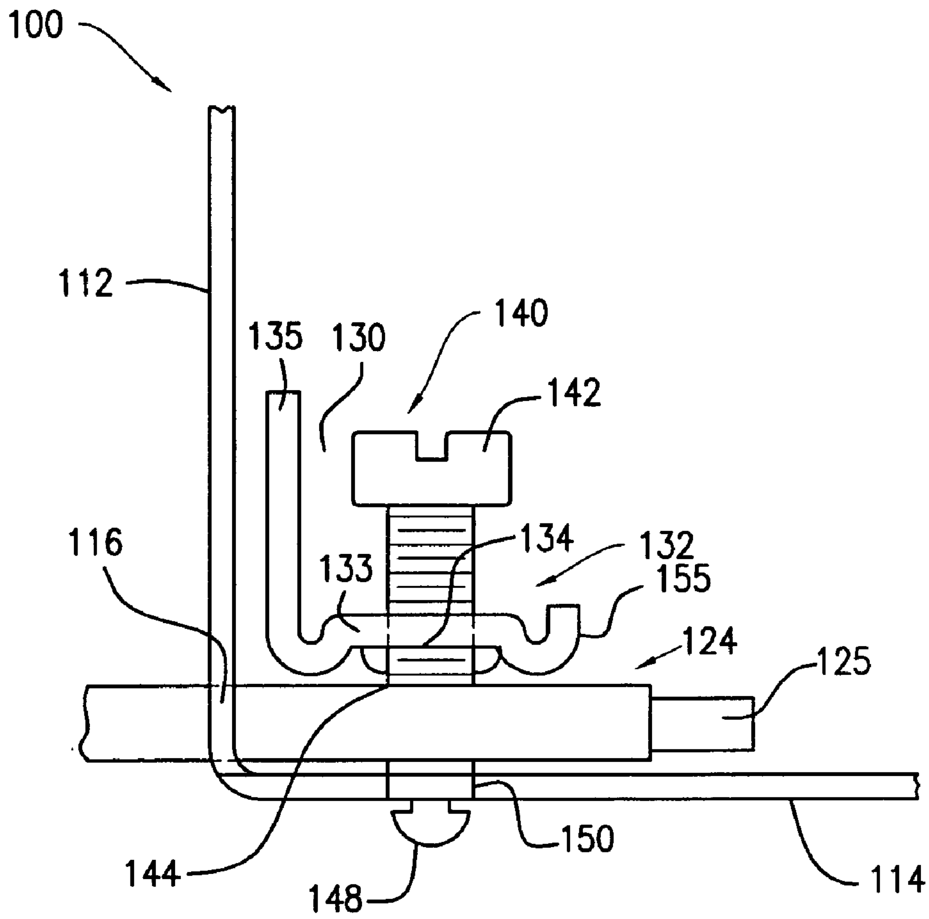
FIG. 3 is a fragmented showing of an electrical outlet box including wire clamp assembly of the present invention.
Figure 4:
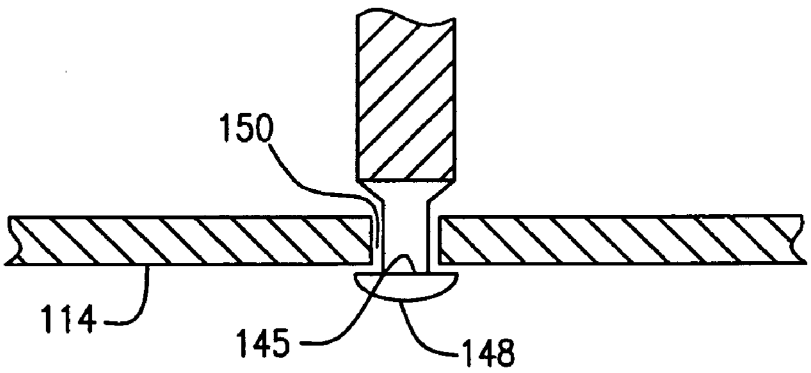
FIG. 4 is a fragmented showing of the captive screw of the present invention.

Referring now to FIGS. 3 and 4, a fragmented portion of an improved outlet box is shown. Outlet box 100 includes back wall 112, and a bottom wall 114. An opening 116 extends through the back wall for insertion of stripped end 125 of an electrical wire 124. The clamp assembly 130 of the present invention includes a generally L-shaped clamp 132. Clamp 132 includes a planar portion 133 generally positioned parallel to the bottom wall 114. An upward portion 135 extends from planar portion 133 and non-rotatably fixes the clamp. The planar portion includes a central internally threaded aperture 134 therethrough. The clamp 132 is supported to the outlet box by a threaded screw 140. The threaded screw 140 has a head portion 142 and an extending threaded shaft 144. A distal end 145 of the shaft includes an attached projection 148 which extends through an opening 150 of the bottom wall of the box. The projection 148 allows the screw to be capitally retained in the aperture so that upon screw rotation, the screw does not progress through the bottom wall 144 of the box. The opening 150 is designed to be smaller than the shaft 144 of the screw preventing such progression.

The clamp includes a central threaded aperture 134 therethrough so that the clamp is threadingly supported to the screw. The screw 140, which is preferably a left handed screw, upon rotation will cause movement of the clamp 132 along the threaded screw. Thus, once the wire is inserted, the screw can be rotated and the clamp will move downward along the shaft toward the wire, clamping the wire between the clamp and bottom wall of the box. In that regard, the clamp includes clamp feet 155 to concentrate the clamping pressure on the wire to secure the wire in the box.

It can be appreciated that continued screw rotation of the screw causes the clamp to more tightly to engage the wire against the bottom wall. However, the screw will not extend outwardly through the box, thereby preventing any contact with the vapor barrier or dry wall such as is prevalent with extending screws of prior clamping assemblies.

What is claimed is:

1. A clamp assembly for clamping an electrical wire to a wall of an outlet box comprising:

a wire clamp non-rotatably supported in said box adjacent to said wall, said wire clamp having an internally threaded aperture therethrough; and a threaded screw captively retained in said box for rotating movement without longitudinal displacement, said threaded screw extending through said threaded aperture of said clamp such that upon said rotating movement of said screw said clamp is longitudinally movable along said threaded screw.

2. The clamp assembly of claim 1 wherein said wire clamp includes a first planar surface generally parallel to said wall with said threaded aperture extending through said first planar surface, said wire being clamped between said wall and said first planar surface.

3. The clamp assembly of claim 1 wherein said wire clamp is L-shaped.

4. The clamp assembly of claim 1 wherein said threaded screw includes a head portion, an attached projection and a threaded shaft extending therebetween.

5. An electrical outlet box assembly comprising:

an outlet box having a back wall, a perimetrical side walls therethrough and an open front face;

a wire clamp non-rotatably supported in said box adjacent to said side wall, said wire clamp having an internally threaded aperture therethrough; and a threaded screw captively retained in said box for rotating movement without longitudinal displacement, said threaded screw extending through said threaded aperture of said clamp such that upon said rotating movement of said screw said clamp is longitudinally movable along said threaded screw.

6. The clamp assembly of claim 5 wherein said wire clamp includes a first planar surface generally parallel to said side wall with said threaded aperture extending through said first planar surface, said wire being clamped between said side wall and said first planar surface.

7. The clamp assembly of claim 5 wherein said wire clamp is L-shaped.

8. The clamp assembly of claim 5 wherein said threaded screw includes a head portion, an attached projection and a threaded shaft extending therebetween.

* * * * *